Dec. 20, 1949     C. C. SPREEN     2,491,529
ELECTRIC COOKING APPARATUS
Filed April 22, 1946     3 Sheets-Sheet 1

INVENTOR.
CHARLES C. SPREEN
BY
*Whittemore Hulbert + Belknap*

ATTORNEYS

INVENTOR.
CHARLES C. SPREEN
BY
Whittemore Hulbert & Belknap
ATTORNEYS

Patented Dec. 20, 1949

2,491,529

UNITED STATES PATENT OFFICE 2,491,529

ELECTRIC COOKING APPARATUS

Charles C. Spreen, Detroit, Mich., assignor to Richard W. Lewis, Walled Lake, Mich.

Application April 22, 1946, Serial No. 664,024

2 Claims. (Cl. 219—19)

The invention relates to electric cooking apparatus and more particularly to the type including electric toasters which are frequently placed on dining and breakfast nook tables for use during the progress of the meal. One limitation to the usefulness of such devices is that there is generally no provision for maintaining the food warm after the completion of the cooking operation. Also it is frequently desirable to cook a limited quantity of other food as, for instance, boiling of eggs.

It is the object of the invention to improve electric cooking devices of this type by incorporating therein one or more additional heating units normally stored in the frame or casing of the unit but capable of being extended into position for use. The invention, therefore, consists in such construction and as more fully hereinafter described.

Figure 1:
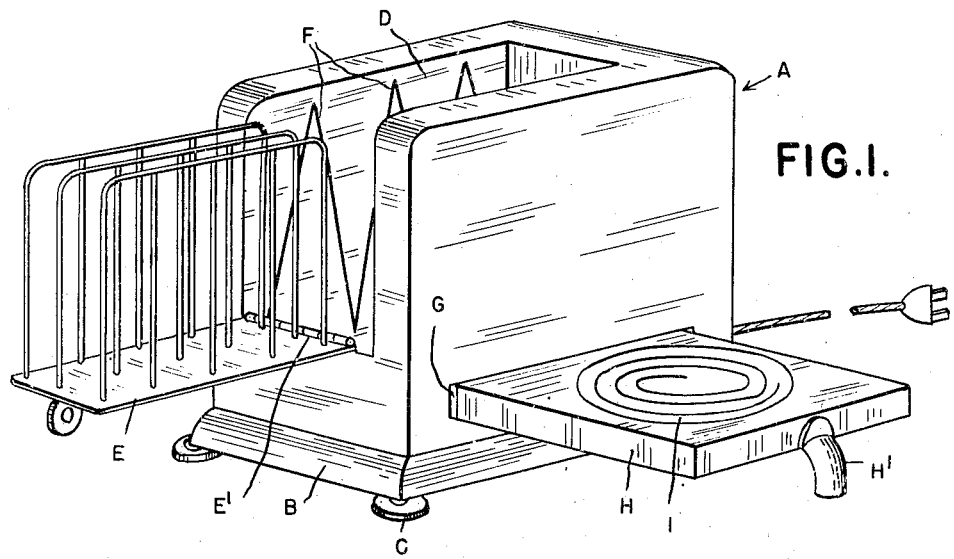
Fig. 1 is a perspective view of one type of electric toaster to which my improvement is applied.
Figure 2:
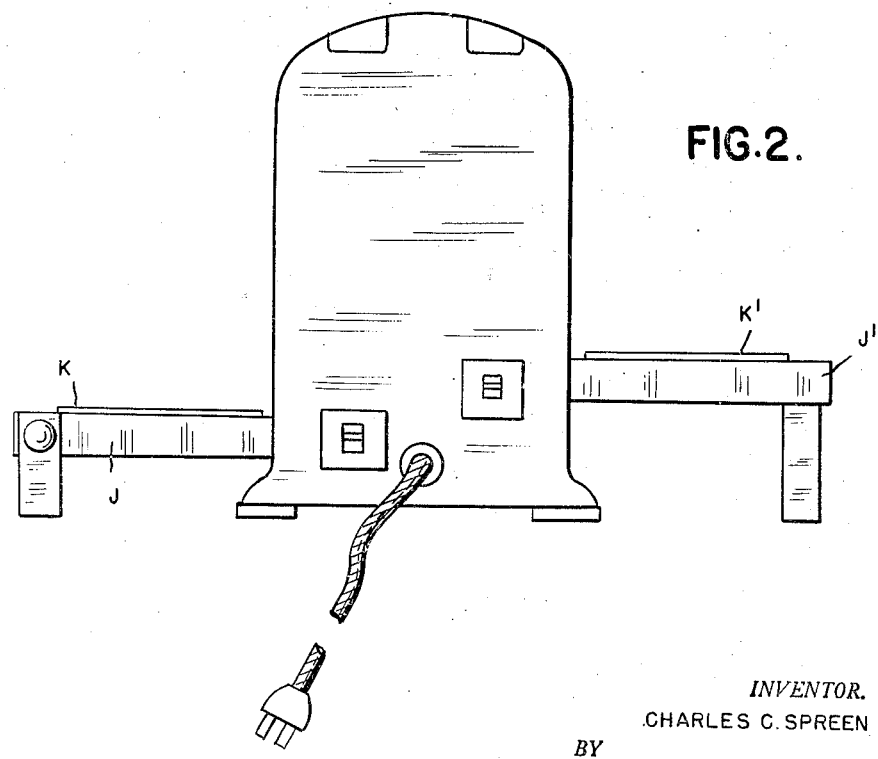
Fig. 2 is an elevation of a slightly modified construction.

As shown in Fig. 1, A is a casing having a base portion B with supporting and heat insulating feet C. The center of the casing A is cut away as at D and a bread holding frame E is hinged at E' to swing into the opening D or outward to clear the same. Heating units F are placed within the casing on opposite sides of the opening D to toast the bread in the inturned position of the frame E. The construction as thus far described is a well-known type of electric toaster. My improved construction is modified from the one above described by slightly increasing the height of the casing A and forming in the base portion thereof an opening G on one or both sides for the insertion and withdrawal of a drawer or shelf H. The latter has supported thereon a heating unit I and the location of the opening G is such that the member H in its stored position is beneath and will clear the unit or units F. In its extended position the drawer or shelf F has at its outer end a leg H', which forms a stable support for the shelf and any food or vessel placed thereon. Thus, simultaneously with the toasting of the bread, other food may be cooked or warmed on the shelf H or it may be used for supporting a warming chamber in which the toast is placed after withdrawal from the frame E.

Figure 3:
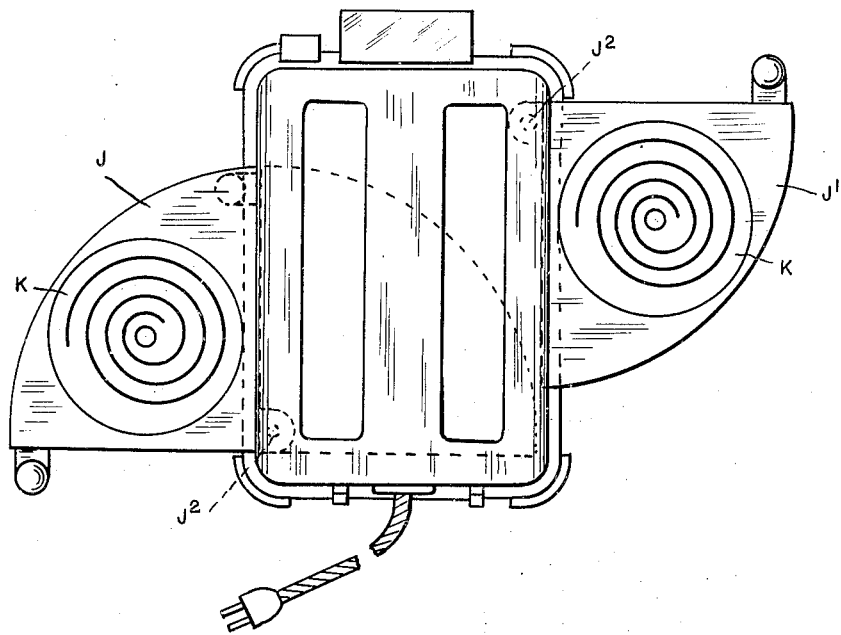
Fig. 3 is a plan view thereof.
Figure 4:
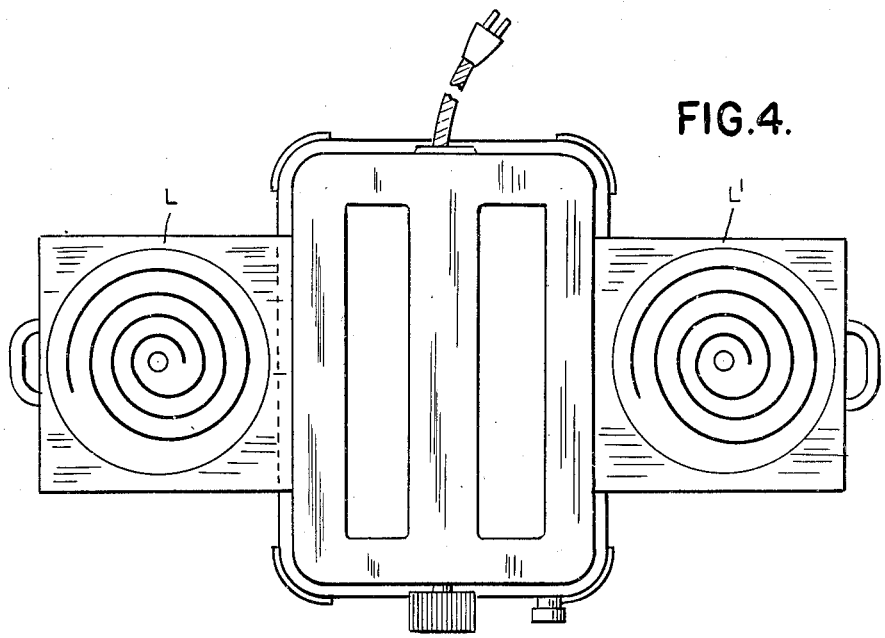
Fig. 4 is a plan view of a construction similar but slightly modified from that shown in Fig. 1.

In the modified construction shown in Fig. 3, the toaster is of the type where the bread is inserted through one or more slots in the top of the casing in proximity to heating units on opposite sides thereof. This casing is also increased in height to accommodate a pair of shelves J and J' each provided with a heating unit K. These shelves are of segmental form and are hinged at $J^2$ to swing in or out through openings in opposite sides of the casing. They are also arranged in different planes but both beneath the toasting units in the upper portion of the casing. The construction shown in Fig. 4 is similar to that in Fig. 3 but the shelves or drawers L and L' are rectangular and slide in or out of the casing.

Figure 5:
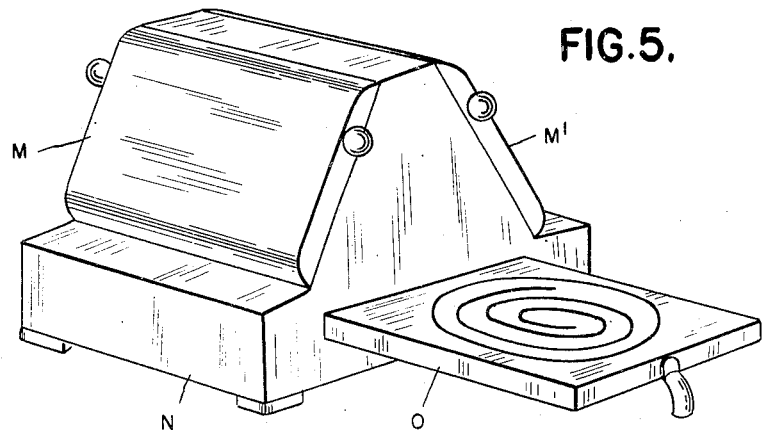

The construction shown in Fig. 5 is another type of toaster having inclined doors or covers M and M' on opposite sides thereof hinged at their lower ends. This is also a well-known type but is modified by increasing the height of the base portion N to accommodate a door or shelf O similar to those previously described.

Figure 6:
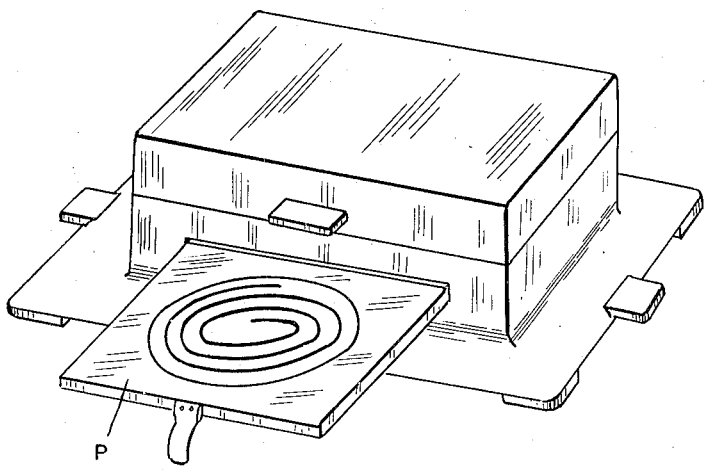
Figs. 5 and 6 are perspective views showing other modifications.

The construction shown in Fig. 6 is a toaster, grill or waffle iron and is modified from the usual construction by increase in height to accommodate a shelf P normally stored beneath the other unit. All of the modifications are essentially the same in that the shelf or shelves for the auxiliary unit or units are normally stored within the casing of the toaster but may be withdrawn therefrom for use.

What I claim as my invention is:

1. A bread toaster and hot plate combination for table use comprising a casing, a slot in said casing for receiving a slice of bread therein, a pair of vertically extending heating units on opposite sides of said slot, and a pair of horizontally extending auxiliary hot plates projecting outwardly from opposite sides of said casing below said vertical heating units, said hot plates being arranged in vertically spaced planes and horizontally movable inwardly into a storage compartment in the base of said casing when not in use.

2. A bread toaster and hot plate combination as defined in claim 1, wherein the hot plates are pivotally mounted on the casing to permit swinging the former into and out of the storage compartment.

CHARLES C. SPREEN.

REFERENCES CITED

The following references are of record in the file of this patent:

UNITED STATES PATENTS

| Number | Name | Date |
|---|---|---|
| 1,341,994 | Nelson | June 1, 1920 |
| 1,431,953 | Henoch | Oct. 17, 1922 |
| 1,697,914 | Hummel et al. | Jan. 8, 1929 |
| 2,063,407 | Smith | Dec. 8, 1936 |
| 2,109,006 | Davis | Feb. 22, 1938 |